(12) United States Patent
Kang et al.

(10) Patent No.: US 12,015,711 B2
(45) Date of Patent: Jun. 18, 2024

(54) DATA SECURITY PROCESSING TERMINAL AND SYSTEM

(71) Applicant: CHINA UNIONPAY CO., LTD., Shanghai (CN)

(72) Inventors: Jialiang Kang, Shanghai (CN); Jien Zhou, Shanghai (CN); Xi Shen, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 294 days.

(21) Appl. No.: 17/619,725

(22) PCT Filed: Jul. 10, 2020

(86) PCT No.: PCT/CN2020/101239
§ 371 (c)(1),
(2) Date: Dec. 16, 2021

(87) PCT Pub. No.: WO2021/004519
PCT Pub. Date: Jan. 14, 2021

(65) Prior Publication Data
US 2022/0360443 A1  Nov. 10, 2022

(30) Foreign Application Priority Data
Jul. 11, 2019  (CN) .......................... 201910624415.9

(51) Int. Cl.
*H04L 9/32*       (2006.01)
*G06F 16/583*   (2019.01)
*H04L 9/06*       (2006.01)

(52) U.S. Cl.
CPC ............ *H04L 9/321* (2013.01); *G06F 16/583* (2019.01); *H04L 9/0618* (2013.01); *G06F 2221/031* (2013.01)

(58) Field of Classification Search
CPC ..... H04L 9/321; H04L 9/0618; H04L 9/0643; H04L 9/0827; H04L 63/0428;
(Continued)

(56) References Cited

U.S. PATENT DOCUMENTS

| 2008/0031446 A1* | 2/2008 | Suga .................. H04N 21/4408 386/E5.069 |
| 2016/0234176 A1 | 8/2016 | Chu et al. |
| 2017/0132417 A1* | 5/2017 | Martinez ............... H04L 9/3234 |

FOREIGN PATENT DOCUMENTS

| CN | 107408254 | 11/2017 |
| CN | 107451514 | 12/2017 |

(Continued)

OTHER PUBLICATIONS

Rejection Decision issued Feb. 11, 2022 for Chinese Patent Application No. 201910624415.9.

(Continued)

*Primary Examiner* — Quazi Farooqui
(74) *Attorney, Agent, or Firm* — K&L Gates LLP

(57) ABSTRACT

The application provides a data security processing terminal, system and method, and is related to a field of data processing. The data security processing terminal includes: an image acquisition device configured to acquire image data and transmit the image data to a Trust Execution Environment through a secure channel; an image acquisition driver operating in the Trust Execution Environment and configured to drive, in response to a drive instruction from a processor, the image acquisition device to acquire the image data; the processor operating in the Trust Execution Environment and configured to send the drive instruction to the image acquisition driver, obtain the image data, encrypt the image data using a stored first key to obtain image ciphertext data, and output the image ciphertext data. The technical (Continued)

solution of the present applicant can be used to ensure the security of image data.

19 Claims, 3 Drawing Sheets

(58) Field of Classification Search
CPC ....... H04L 63/205; H04L 9/32; G06F 16/583; G06F 2221/031; G06F 21/6209; G06F 21/32; G06V 40/166; G06V 40/45
See application file for complete search history.

(56) References Cited

FOREIGN PATENT DOCUMENTS

| | | |
|---|---|---|
| CN | 107808104 | 3/2018 |
| CN | 108711054 | 10/2018 |
| CN | 108804895 A | 11/2018 |
| CN | 109145628 | 1/2019 |
| CN | 109191131 | 1/2019 |
| CN | 109508562 | 3/2019 |
| CN | 109918881 | 6/2019 |
| CN | 110474874 | 11/2019 |
| WO | WO2019095357 | 5/2019 |

OTHER PUBLICATIONS

Re-examination Decision issued Jun. 2, 2022 for Chinese Patent Application No. 201910624415.9.
The Third Office Action issued Jul. 12, 2022 for Chinese Patent Application No. 201910624415.9.
First Office Action issued on Feb. 1, 2021 for Chinese patent application No. 201910624415.9.
Second Office Action issued on Aug. 6, 2021 for Chinese patent application No. 201910624415.9.
International Search Report and Written Opinion issued on Oct. 12, 2020 for International PCT Application No. PCT/CN2020/101239.

* cited by examiner

DATA SECURITY PROCESSING TERMINAL AND SYSTEM

CROSS REFERENCE TO RELATED APPLICATION

The present application is a National Stage of International Application No. PCT/CN2020/101239, filed on Jul. 10, 2020, which claims the priority of Chinese Patent Application No. 201910624415.9 filed on Jul. 11, 2019, entitled "DATA SECURITY PROCESSING TERMINAL, SYSTEM AND METHOD". Both of the applications are incorporated herein by reference in their entireties.

TECHNICAL FIELD

The present application relates to the technical field of data processing, in particular to a data security processing terminal, system and method.

BACKGROUND

Face recognition is a biometric identification technology based on human facial feature information for identity recognition. Nowadays, with rapid development of face recognition technology, face recognition is increasingly used in various scenarios, such as transaction scenarios.

Human facial feature information is unique and not easy to be duplicated, which makes face recognition have a great advantage in accuracy. Due to the above characteristics of facial feature information, security of face data (that is, data of human facial feature information) is more important. In order to ensure the security of face data, a recognition terminal includes an encryption module. The encryption module can encrypt the face data transmitted from an image acquisition device, and upload the encrypted face data for face recognition. However, the face data may be tampered with or leaked in the image acquisition device or during transmission from the image acquisition device to the recognition terminal, which reduces the security of the face data.

SUMMARY

Embodiments of the present application provide a data security processing terminal, system and method.

In a first aspect, the embodiments of the present application provide a data security processing terminal, including: an image acquisition device configured to acquire image data and transmit the image data to a Trust Execution Environment through a secure channel; an image acquisition driver operating in the Trust Execution Environment and configured to drive, in response to a drive instruction, the image acquisition device to acquire the image data; a processor operating in the Trust Execution Environment and configured to send the drive instruction to the image acquisition driver, obtain the image data, encrypt the image data using a stored first key to obtain image ciphertext data, and output the image ciphertext data.

In a second aspect, the embodiments of the present application provide a data security processing system, including: the data security processing terminal according to the first aspect; a server configured to decrypt the image ciphertext data output by the data security processing terminal using the stored first key.

In a third aspect, the embodiments of the present application provide a data security processing method applied to the data security processing terminal according to the first aspect. The data security processing method includes: sending, by the processor, the drive instruction to the image acquisition driver in the Trust Execution Environment; driving, by the image acquisition driver in the Trust Execution Environment and in response to a drive instruction from the processor, the image acquisition device to acquire the image data; acquiring, by the image acquisition device, the image data and transmitting the image data to the Trust Execution Environment through the secure channel; obtaining, by the processor in the Trust Execution Environment, the image data, encrypting the image data using the stored first key to obtain the image ciphertext data, and outputting the image ciphertext data.

In a fourth aspect, the embodiments of the present application provide a data security processing method applied to the data security processing system according to the second aspect. The data security processing method includes: acquiring, by the data security processing terminal, image data, encrypting the image data using a stored first key in a Trust Execution Environment to obtain image ciphertext data, and outputting the image ciphertext data to the server; decrypting, by the server using the stored first key, the image ciphertext data output by the data security processing terminal.

BRIEF DESCRIPTION OF THE DRAWINGS

The present application can be better understood from the following description of the specific implementations of the present application in conjunction with the accompanying drawings. In the drawings, the same or similar reference signs indicate the same or similar features.

DETAILED DESCRIPTION

Figure 1:
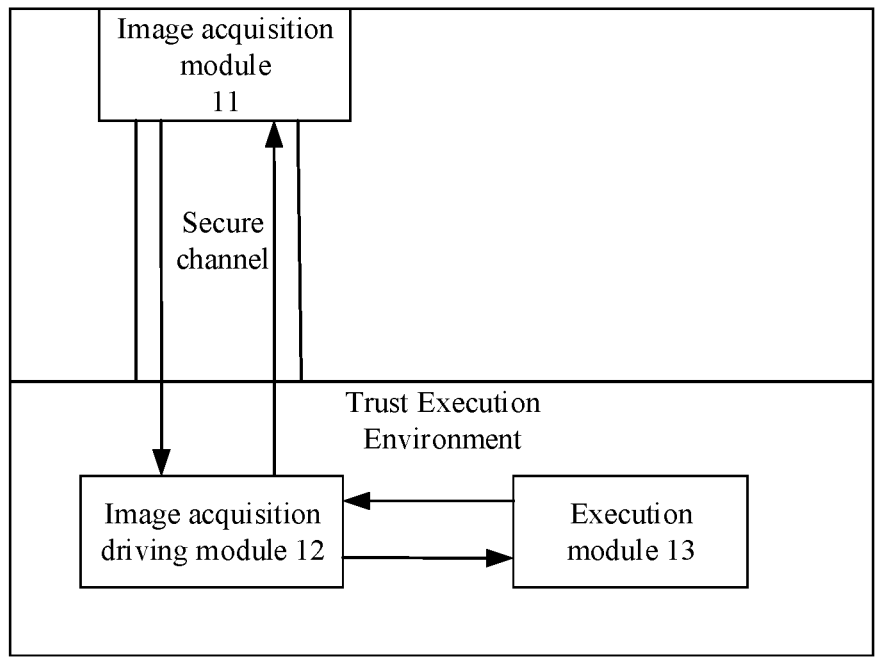
FIG. 1 is a schematic structural diagram of a data security processing terminal provided by an embodiment of the present application.

Features and exemplary embodiments of various aspects of the present application will be described in detail below. In the following detailed description, many specific details are proposed in order to provide a comprehensive understanding of the present application. However, it is obvious to those skilled in the art that the present application can be implemented without some of these specific details. The following description of the embodiments is only to provide a better understanding of the present application by showing examples of the present application. The present application is by no means limited to any specific configurations and algorithms proposed below, but covers any modification, replacement and improvement of elements, components and algorithms without departing from the spirit of the present application. In the drawings and the following description, well-known structures and technologies are not shown in order to avoid unnecessary obscurity of the application.

The embodiments of the present application provide a data security processing terminal, system, and method, which can be applied to a scenario where an image is acquired, the image is recognized, and certain operations are performed according to the recognition result. For example, the scenario may include various business scenarios based on face recognition, specifically, including but not limited to transaction business, login business, attendance business (such as clocking in at work), and traffic business (such as passing through a gate).

The data security processing terminal can acquire image data. Specifically, a face recognition application may be installed in the data security terminal to provide a user with face recognition related business. The form of the data security processing terminal is not limited. The data security processing terminal may be a large-scale device such as a vending machine, or a small desktop self-service face scanning terminal, such as a smart sale terminal (i.e. a POS terminal), a gate, a self-service cashier terminal and the like.

The data security processing system may include a data security processing terminal and a server. The server can perform data verification and face recognition, and output the recognition result. The data security processing system will be described in detail below.

FIG. 1 is a schematic structural diagram of a data security processing terminal provided by an embodiment of the present application. As shown in FIG. 1, the data security processing terminal 10 may include an image acquisition device 11, an image acquisition driver 12 and a processor 13.

The data security processing terminal can provide a Trust Execution Environment (TEE) and a Rich Execution Environment (REE). TEE has its own independent execution control, and has a security level higher than that of REE. TEE is separated from REE. In the data security processing terminal, REE can only communicate with TEE through a specific interface. The REE may specifically be an operating system of the data security processing terminal, such as an Android operating system, which is not limited here.

The image acquisition device 11 is configured to acquire image data, and transmit the image data to the Trust Execution Environment through a secure channel.

The image acquisition device 11 can operate in the Rich Execution Environment. The image acquisition device 11 may specifically include a camera module, which can normally capture image information so as to acquire the image data. The image data may specifically be RGB image data, and the RGB image data is image data that adopts the RGB (i.e., red, green, and blue) color standard.

Before the image acquisition device 11 communicates with the TEE, the secure channel can be established between the image acquisition device 11 and the TEE. All data communicated in the secure channel is encrypted for transmission, so that the transmission of the data between the image acquisition device 11 and the TEE is no longer public and thus it is possible to effectively prevent eavesdropping and ensure the security of the image data acquired by the image acquisition device 11. Specifically, the image data is transmitted to the TEE through the secure channel, which may mean that the image data to be transmitted is processed by encryption, protocol encapsulation, protocol nesting, or the like, and the processed image data is transmitted to the TEE. Only a module operating in the TEE can interpret and process the processed image data, that is, restore the processed image data to original image data.

The image acquisition driver 12 operates in the TEE, and is configured to drive, in response to a drive instruction from the processor, the image acquisition device to acquire the image data.

The processor 13 operates in the Trust Execution Environment, and is configured to send the drive instruction to the image acquisition driver, obtain the image data, encrypt the image data using a stored first key to obtain image ciphertext data, and output the image ciphertext data. Specifically, the processor 13 may obtain the image data from the Trust Execution Environment.

When the data security processing terminal 10 is required to acquire the image data, the processor 13 sends the drive instruction to the image acquisition driver 12, and the drive instruction instructs the image acquisition driver 12 to drive the image acquisition device 11 to acquire the image data.

In order to prevent malicious driving of the image acquisition device 11, the image acquisition driver 12 operates in the TEE, and the processor 13 also operates in the TEE. A Trust Application (TA) can run in the TEE. The TA can specifically run in the processor 13, that is, the TA can be implemented by the processor 13. The TA can provide to outside an interface for invoking by the image acquisition device 11, and the image acquisition driver 12 drives the image acquisition device 11 to work.

The TEE can protect resources and data of the TA running in the processor 13 to ensure confidentiality, integrity and access authority. In other words, the TEE can ensure the confidentiality, the integrity and the access authority of the resources and data of the processor 13.

The image data acquired by the image acquisition device 11 may be transmitted to the processor 13 through the image acquisition driver 12. The image data acquired by the image acquisition device 11 may also be transmitted to the TEE, and the processor 13 may obtain the image data from the TEE. The manner in which the processor 13 obtains image data is not limited here.

The processor 13 may store a first key and use the first key to encrypt the obtained image data, and the encrypted image data is the image ciphertext data. An encryption algorithm for image data encryption is not limited here and can be a symmetric or asymmetric encryption algorithm. For example, the encryption algorithm may include but not be limited to a Data Encryption Standard (DES) algorithm, a Triple Data Encryption Standard (3DES) algorithm, an Advanced Encryption Standard (AES) algorithm, a RSA algorithm (that is, an asymmetric encryption algorithm), a SM4 algorithm (that is, a standard block cipher algorithm), etc.

In the embodiments of the present application, the image acquisition device 11 in the data security processing terminal 10 transmits the acquired image data to the Trust Execution Environment through the secure channel. The processor 13 encrypts the image data. The encrypted image data (i.e. the image ciphertext data) is difficult to be tampered with, and the driving of the image acquisition device 11 by the image acquisition driver 12 and the encryption of the image data by the processor 13 are both performed in the Trust Execution Environment. Therefore, the process of encrypting the image data and the process of the image acquisition driver 12 driving the image acquisition device 11 are also safe, thereby ensuring the security of the image data.

In some embodiments, in order to further ensure security and accuracy of decrypted image ciphertext data used for the recognition function in the server, the above processor 13 is further configured to output image verification auxiliary information obtained based on the image data. The image verification auxiliary information is used to assist in security verification of the decrypted image ciphertext data.

The image verification auxiliary information is used to perform the security verification on the decrypted image ciphertext data. The security verification here refers to verifying whether the image ciphertext data transmitted by the image acquisition device has been tampered with or whether there is an error. With the security verification, the accuracy of the transmitted image data is guaranteed. A successful security verification indicates that the image ciphertext data transmitted by the image acquisition device is accurate. If the security verification fails, it means that the image ciphertext data transmitted by the image acquisition device is not accurate. Thus the server can determine whether to perform image recognition, such as face recognition, according to whether the security verification is successful.

In some examples, the above processor 13 may be specifically configured to: calculate a digest of the image data according to a digest algorithm; calculate a signature of the digest of the image data using a stored second key, and use the signature of the digest of the image data as the image verification auxiliary information.

The second key is stored in the processor 13. The digest algorithm is not limited. A MD5 Message-Digest Algorithm (MD5), a Secure Hash Algorithm (sha1), a sha256 algorithm (i.e., a hash value algorithm), a SM3 algorithm (i.e., a standard for cryptographic hash function) and the like can be used. The signature algorithm is also not limited.

In other examples, the processor 13 is specifically configured to: obtain first integrated data, the first integrated data including a task identifier of a current task for acquiring the image data and a digest of the image data calculated according to a digest algorithm; calculate an integrated signature of the first integrated data using a stored third key, and use the integrated signature of the first integrated data as the image verification auxiliary information.

The third key is stored in the processor 13. When the data security processing terminal 10 receives a task request, the processor 13 may send a drive instruction to the image acquisition driver 12 so that the image acquisition driver 12 drives the image acquisition device 11 to acquire the image data. In order to be able to match the image data with a task for the task request in the subsequent image recognition, the integrated signature for the task identifier of the current task for acquiring the image data and the digest of the image data can be calculated as the image verification auxiliary information.

The task identifier is used to identify the task, and the task identifier can be set according to a specific work scenario. For example, in a transaction business scenario, the task identifier may be an order number. In a traffic business scenario, the task identifier may be a traffic task label.

By using the integrated signature of the first integrated data as the image verification auxiliary information, it is possible to match the recognition result with the current task in the subsequent image recognition and ensure pertinence and accuracy of the image recognition and the task.

The processor 13 operates in the Trust Execution Environment, so the processor 13 can communicate with other modules or units in the Trust Execution Environment, and can also communicate with a module or unit in the REE or in the data security processing terminal 10. In order to ensure that the encryption process of the image data and the control process of the image acquisition driver 12 by the processor 13 are safe, the processor 13 does not directly communicate with a device outside the data security processing terminal 10.

Figure 2:
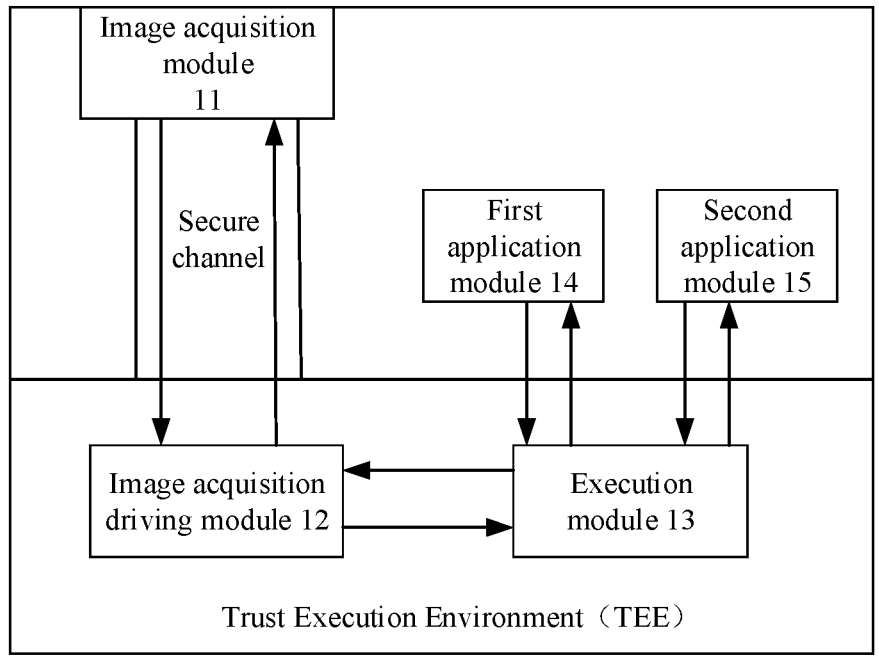
FIG. 2 is a schematic structural diagram of a data security processing terminal provided by another embodiment of the present application.

In some examples, FIG. 2 is a schematic structural diagram of a data security processing terminal provided by another embodiment of the present application. As shown in FIG. 2, the data security processing terminal 10 may further include a first application 14 or a second application 15 to obtain image verification information according to the image verification auxiliary information. For ease of illustration, FIG. 2 shows both the first application 14 and the second application 15. In actual applications, the data security processing terminal 10 may include one of the first application 14 and the second application 15. A Client Application (CA) may run in the first application 14 or the second application 15, that is, the CA can be implemented by the first application 14 or the second application 15.

The first application 14 is configured to obtain the image ciphertext data and the image verification auxiliary information, use the image verification auxiliary information as the image verification information, and output the image ciphertext data and the image verification information to the server.

The first application 14 may communicate with the processor 13 and may also communicate with other devices outside the data security processing terminal 10. The first application 14 may directly output the image verification auxiliary information as the image verification information to the server.

The first application 14 may transmit the image verification information and the image ciphertext data together or separately, which is not limited here.

The second application 15 is configured to obtain the image ciphertext data and the image verification auxiliary information, process the image verification auxiliary information to obtain the image verification information, and output the image ciphertext data and the image verification information to the server. The image verification information is used for the security verification of the decrypted image ciphertext data.

The second application 15 may communicate with the processor 13 and may also communicate with other devices outside the data security processing terminal 10. The second application 15 needs to process the image verification auxiliary information to obtain the image verification information and then output the image verification information to the server.

The second application 15 may transmit the image verification information and the image ciphertext data together or separately, which is not limited here.

In some examples, in a case where the image verification auxiliary information output by the processor 13 includes the image data, the second application 15 is specifically configured to: calculate a digest of the image data according to a digest algorithm; calculate a signature of the digest of the image data using a stored fourth key, and use the signature of the digest of the image data as the image verification information.

The fourth key is stored in the second application 15. Both the digest calculation and the signature calculation are executed by the second application 15.

In another example, the image verification auxiliary information includes the image data. The second application 15 is specifically configured to: obtain second integrated data, the second integrated data including a task identifier of a current task for acquiring the image data and a digest of the image data calculated according to a digest algorithm;

calculate an integrated signature of the second integrated data using a stored fifth key, and use the integrated signature of the second integrated data as the image verification information.

The fifth key is stored in the second application 15. Both the digest calculation and the signature calculation are executed by the second application 15. For the related content of the second integrated data, reference may be made to the related description of the first integrated data in the foregoing embodiments, and details will not be repeated here.

In order to prevent someone from providing false image data using forgery means such as photos or videos, the above image acquisition device 11 is further configured to acquire live-body feature data corresponding to the image data, thereby further improving security and reliability of subsequent recognition functions. Correspondingly, the image acquisition driver 12 is further configured to drive, in response to the drive instruction, the image acquisition device 11 to acquire the live-body feature data.

Specifically, the image acquisition device 11 may include a live-body feature capturing module, which can acquire 3D live-body feature data of a live creature. The live-body feature capturing module may specifically be a 3D live-body detection module. The 3D live-body detection module may include, but not limited to, a structured light module, a Time of Flight (TOF) module, an infrared detection module, etc. The live-body feature data can be used for live-body detection so as to determine whether an object of the acquired image data is a live body of a living creature.

Accordingly, in some example, the processor 13 is further configured to: perform a live-body detection based on the live-body feature data to obtain live-body detection result data; obtain a signature of the live-body detection result data using a stored sixth key, and output the live-body detection result data and the signature of the live-body detection result data.

The sixth key is stored in the processor 13. Both the live-body detection and the signature calculation are executed by the processor 13.

The live-body detection result data can indicate whether the object of the acquired live-body feature data is a live body of a living creature. By outputting the signature of the live-body detection result data, it is possible to prevent the live-body detection result data from being tampered with, being leaked or the like. The signature algorithm is not limited here either. The live-body detection result data and the signature of the live-body detection result data can be used for live-body detection security verification in the subsequent process.

In some other examples, the processor 13 is further configured to: obtain third integrated data; obtain an integrated signature of the third integrated data using a stored seventh key, and use the integrated signature of the third integrated data as the image verification auxiliary information;

The third integrated data includes a task identifier of a current task for acquiring the image data, a digest of the image data calculated according to a digest algorithm, and live-body detection result data obtained by performing a live-body detection based on the live-body feature data.

In order to facilitate the follow-up live-body detection security verification, the processor 13 is further configured to output the live-body detection result data.

The seventh key is stored in the processor 13, and the digest calculation, the live-body detection, and the signature calculation are all executed by the processor 13.

The task identifier, the digest of the image data, and the live-body detection result data are regarded as integrated data, and an integrated signature of the integrated data is used as the image verification auxiliary information. It is possible to further ensure the accuracy and reliability of the live-body detection security verification in the subsequent process, and prevent the live-body detection result data and the image data from being tampered with, leaked or the like during the transmission process.

The live-body detection, the signature calculation or the like can also be executed by the second application 15 in the above embodiments.

In some examples, the processor 13 is further configured to transmit the live-body feature data to the second application 15.

The second application 15 is configured to perform a live-body detection based on the live-body feature data to obtain live-body detection data, obtain a signature of the live-body detection data using a stored eighth key, and output the live-body detection data and the signature of the live-body detection data.

The eighth key is stored in the second application 15.

In some other examples, the processor 13 is further configured to transmit the live-body feature data to the second application 15.

The second application 15 is configured to obtain fourth integrated data; obtain an integrated signature of the fourth integrated data using a stored ninth key, and use the integrated signature of the fourth integrated data as the image verification auxiliary information; and output the live-body detection result data to the server.

The ninth key is stored in the second application 15. The fourth integrated data includes a task identifier of a current task for acquiring the image data, a digest of the image data calculated according to a digest algorithm, and live-body detection result data obtained by performing a live-body detection based on the live-body feature data.

The task identifier, the digest of the image data, and the live-body detection result data are regarded as integrated data, and an integrated signature of the integrated data is used as the image verification auxiliary information. It is possible to further ensure the accuracy and reliability of the live-body detection security verification in the subsequent process, and prevent the live-body detection result data and the image data from being tampered with, leaked or the like during the transmission process.

Whether the image acquisition device 11 in the data security processing terminal 10 acquires the live-body feature data can be set according to specific work scenarios and work requirements. For example, in an application scenario where there is a person on duty and probability of fraud is low, the live-body feature data may not be acquired. That is, it is not necessary to add the function of live-body feature data acquisition in the image acquisition device 11, thereby reducing the cost of the image acquisition device.

The first key to the ninth key in the foregoing embodiments may be the same key or different keys, which is not limited herein.

The data security processing terminal 10 may use the image data or the image ciphertext data to perform a recognition-related task. The recognition-related task is a task related to image recognition such as face recognition. Performing the recognition-related task can be implemented by the first application 14 or the second application 15 in the foregoing embodiments.

In some examples, the image verification auxiliary information includes the image data. The first application 14 or the second application 15 receives the image verification auxiliary information, and can use the image data in the image verification auxiliary information to the perform recognition-related task. For example, the first application 14 or the second application 15 causes the data security processing terminal 10 to display an image interface corresponding to the image data according to the image data, so as to directly display the image data to the user. In another example, the first application 14 or the second application 15 performs image tracking on a recognized object according to the received image data.

In other examples, the first application 14 or the second application 15 is also configured to decrypt the image ciphertext data output by the processor using the stored first key, and perform the recognition-related task based on the decrypted image ciphertext data.

The first key is also stored in the first application 14 or the second application 15. After the processor completes the encryption of the image data, the first application 14 or the second application 15 obtains the image ciphertext data and decrypts the image ciphertext data using the first key, and the decrypted image ciphertext data is the image data. About using the image data to perform the recognition-related task, reference can be made to the related content in the above examples, and details will not be repeated here.

In order to ensure the security of the image data, the first application 14 and/or the second application 15 in the above embodiments requires an initiator of an image acquisition authority request to have an authority to acquire the image data. The first application 14 and/or the second application 15 may also authenticate the initiated image acquisition authority request.

Specifically, the first application 14 or the second application 15 is further configured to: receive an image acquisition authority request, verify whether the initiator of the image acquisition authority request has the image acquisition authority, and send an invoking instruction to the processor 13 when it is verified that the initiator of the image acquisition authority request has the image acquisition authority.

The processor 13 is further configured to send a drive instruction to the image acquisition driver 12 in response to the invoking instruction.

The image acquisition authority request may be a request input by the user or a request issued by an application program in the data security processing terminal, which is not limited here. When it is verified that the initiator of the image acquisition authority request has the image acquisition authority, the application module can invoke the interface of the processor and send an invoking instruction to the processor.

In order to be able to perform the recognition, the first application 14 or the second application 15 is further configured to acquire user identity information, and output the user identity information to the server, and receive the recognition result sent by the server, and process business corresponding to the image data acquisition according to the recognition result.

Specifically, the user identity information may include the user's mobile phone number, certain digits of the user's mobile phone number, the user's account and the like, which is not limited here. The recognition result indicates whether the image data matches the user corresponding to the user identity information. If the image data matches the user corresponding to the user identity information, the business corresponding to the image data acquisition can be performed. If the image data does not match the user corresponding to the user identity information, the business corresponding to the image data acquisition will not be performed. The business corresponding to the image data acquisition includes but not limited to transaction business, login business, attendance business, traffic business, etc.

In order to be able to more completely describe the entire data security transmission process and the recognition process, the data security processing system in the embodiments of the present application will be described below.

Figure 3:
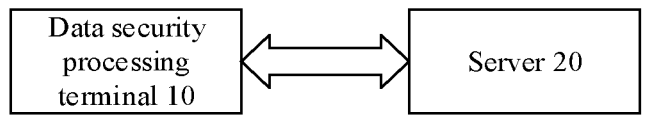
FIG. 3 is a schematic structural diagram of a data security processing system provided by an embodiment of the present application.

FIG. 3 is a schematic structural diagram of a data security processing system provided by an embodiment of the present application. As shown in FIG. 3, the data security processing system includes the data security processing terminal 10 and the server 20 in the above embodiments.

For the relevant description of the data security processing terminal 10, reference can be made to the above relevant content, and details will not be repeated here.

The server 20 is configured to use the stored first key to decrypt the image ciphertext data output by the data security processing terminal 10.

The first key is only stored in the data security processing terminal 10 and the server 20, which makes the first key hard to be leaked. The image ciphertext data can only be decrypted by the server 20 storing the first key, and neither the face recognition application nor any third party can decrypt the image ciphertext data. The security of image data transmission can be further improved, and the accuracy and security of recognition functions such as face recognition can also be improved.

For the technical effects of the data security processing system, reference can be made to the technical effects of the data security processing terminal 10 in the foregoing embodiments, and details will not be repeated here.

The server 20 may also perform user recognition based on the user identity information acquired by the data security processing terminal 10 and the decrypted image ciphertext data, and send the recognition result to the data security processing terminal 10.

In the embodiment of the present application, in order to further ensure the security and reliability of the data transmitted in the data security processing system, the server may also use the image verification information output by the data security processing terminal 10 to perform security verification on the decrypted image ciphertext data. The image verification information herein is obtained based on the image verification auxiliary information.

The specific method for security verification can be determined depending on the content of the image verification information.

In some examples, the image verification information includes the signature of the digest of image data calculated using the second key or the fourth key. The server 20 stores the second key or the fourth key. The server 20 may calculate the digest of the decrypted image ciphertext data, and use the stored second key or fourth key to match the digest of the decrypted image ciphertext data with the image verification information. If the digest of the decrypted image ciphertext data matches the image verification information, the server 20 determines that the security verification is successful. If the digest of the decrypted image ciphertext data does not match the image verification information, the server 20 determines that the security verification has failed.

Specifically, the server 20 may use the stored second key or fourth key to obtain the signature of the digest of the decrypted image ciphertext data. The signature of the digest of the decrypted image ciphertext data is compared with the signature of the digest of the image data in the image verification information. If the signature of the digest of the decrypted image ciphertext data is consistent with the signature of the digest of the image data in the image verification information, it is considered that the digest of the decrypted image ciphertext data matches the image verification information. If the signature of the digest of the decrypted image ciphertext data is inconsistent with the signature of the digest of the image data in the image verification information, it is considered that the digest of the decrypted image ciphertext data does not match the image verification information.

Alternatively, the server 20 may use the stored second key or fourth key to obtain the digest of the image data corresponding to the image verification information according to the signature of the digest of the image data in the image verification information. The digest of the image data corresponding to the image verification information is compared with the digest of the decrypted image ciphertext data. If the digest of the image data corresponding to the image verification information is consistent with the digest of the decrypted image ciphertext data, it is considered that the digest of the decrypted image ciphertext data matches the image verification information. If the digest of the image data corresponding to the image verification information is inconsistent with the digest of the decrypted image ciphertext data, it is considered that the digest of the decrypted image ciphertext data does not match the image verification information.

If the signature of the digest of the image data in the image verification information is calculated using the second key, the second key is also used in the security verification process. Similarly, if the signature of the digest of the image data in the image verification information is calculated using the fourth key, the fourth key is also used in the security verification process.

In some other examples, the image verification information includes the integrated signature of the first integrated data calculated by using the third key or the integrated signature of the second integrated data calculated by using the fifth key. The server 20 stores the third key or the fifth key.

The server 20 may calculate the digest of the decrypted image ciphertext data, and use the stored third key or fifth key to match the digest of the decrypted image ciphertext data with the image verification information. If the digest of the decrypted image ciphertext data matches the image verification information, the server 20 determines that the security verification is successful. If the digest of the decrypted image ciphertext data does not match the image verification information, the server 20 determines that the security verification has failed.

Specifically, if the digest of the decrypted image ciphertext data matches the digest of the image data in the first integrated signature or the second integrated signature in the image verification information, it is considered that the digest of the decrypted image ciphertext data matches the image verification information. Specifically, for the process of matching the digest of the decrypted image ciphertext data with the image verification information, reference may be made to the process of matching the digest of the decrypted image ciphertext data with the image verification information in the above examples, and details will not be repeated here.

If the integrated signature of the first integrated data in the image verification information is calculated using the third key, the third key is also used in the security verification process. Similarly, if the integrated signature of the second integrated data in the image verification information is calculated using the fifth key, the fifth key is also used in the security verification process.

In the embodiment of the present application, the success of security verification indicates that the image ciphertext data has not been tampered with and is accurate. The failure of security verification indicates that the image ciphertext data is inaccurate. Thus the security and reliability of the data transmitted in the data security processing system can be further ensured, and the security and reliability of the recognition function such as face recognition in the subsequent process can be improved.

The data security processing terminal 10 is further configured to output user identity information to the server.

If the security verification is successful, the server 20 is further configured to perform user recognition based on the user identity information and the decrypted image ciphertext data to obtain a recognition result, and send the recognition result to the data security processing terminal 10. If the security verification fails, the user recognition will not be performed. Thus the security and reliability of the recognition function such as face recognition can be ensured.

In some embodiments, the data security processing terminal 10 is further configured to acquire live-body feature data. The data security processing system can also perform live-body detection security verification on the live-body feature data.

In some examples, the data security processing terminal 10 is further configured to output the live-body detection result data and the signature of the live-body detection result data obtained by using a first target key.

The server 20 is further configured to match the signature of the live-body detection result data with the live-body detection result data based on the stored first target key, and determine that the live-body detection security verification is successful when the live-body detection result data matches the signature of the live-body detection result data. Likewise, if the live-body detection result data does not match the signature of the live-body detection result data, it is determined that the live-body detection security verification fails.

Both the data security processing terminal 10 and the server 20 store the first target key. The first target key may include the sixth key or the eighth key in the above embodiments.

Specifically, the server 20 may process the transmitted live-body detection result data based on the first target key to obtain the signature of the live-body detection result data. The obtained signature of the live-body detection result data is compared with the transmitted signature of the live-body detection result data. If the obtained signature of the live-body detection result data is consistent with the transmitted signature of the live-body detection result data, it is considered that the transmitted signature of the live-body detection result data matches the live-body detection result data. If the obtained signature of the live-body detection result data is inconsistent with the transmitted signature of the live-body detection result data, it is considered that the transmitted signature of the live-body detection result data does not match the live-body detection result data.

Alternatively, the server 20 may process the transmitted signature of the live-body detection result data based on the first target key to obtain the live-body detection result data. The obtained live-body detection result data is compared with the transmitted live-body detection result data. If the obtained live-body detection result data is consistent with the transmitted live-body detection result data, it is considered that the transmitted signature of the live-body detection result data matches the live-body detection result data. If the obtained live-body detection result data is inconsistent with the transmitted live-body detection result data, it is considered that the transmitted signature of the live-body detection result data does not match the live-body detection result data.

In this example, live-body detection security verification can be performed, thereby further ensuring the security and reliability of the data transmitted in the data security processing system, and improving the security and reliability of the recognition function such as face recognition in the subsequent process.

In other examples, the image verification information includes an integrated signature of target integrated data obtained by using a second target key. The target integrated data includes a digest of the image data, a task identifier and live-body detection result data.

The data security processing terminal is further configured to output the live-body detection result data.

The server is specifically configured to calculate a digest of the decrypted image ciphertext data, match the digest of the decrypted image ciphertext data with the image verification information and match the live-body detection result data with the image verification information based on the stored second target key, and determine that security verification is successful under a condition that the digest of the decrypted image ciphertext data matches the image verification information, and determine that live-body detection security verification is successful under a condition the live-body detection result data matches the image verification information.

Both the data security processing terminal 10 and the server 20 store the second target key. The second target key includes the seventh key in the above embodiments, and the target integrated data in this example includes the third integrated data in the above embodiments. The second target key includes the ninth key in the above embodiments, and the target integrated data in this example includes the fourth integrated data in the above embodiments.

In the embodiment of the present application, the success of the live-body detection security verification indicates that the live-body detection result data has not been tampered with and is accurate. The failure of the live-body detection security verification indicates that the live-body detection result data is inaccurate. The double verification including the security verification and the live-body detection security verification is performed, so as to further ensure the security and reliability of the data transmitted in the data security transmission system and further improve the security and reliability of the recognition function such as face recognition in the subsequent process.

The data security processing terminal 10 is further configured to output user identity information to the server 20.

If the security verification is successful and the live-body detection security verification is successful, the server 20 is further configured to perform user recognition based on the user identity information and the decrypted image ciphertext data to obtain a recognition result, and send the recognition result to the data security processing terminal. If at least one of the security verification and the live-body detection security verification fails, the user recognition will not be performed. Thus the security and reliability of the recognition function such as face recognition can be ensured.

Figure 4:
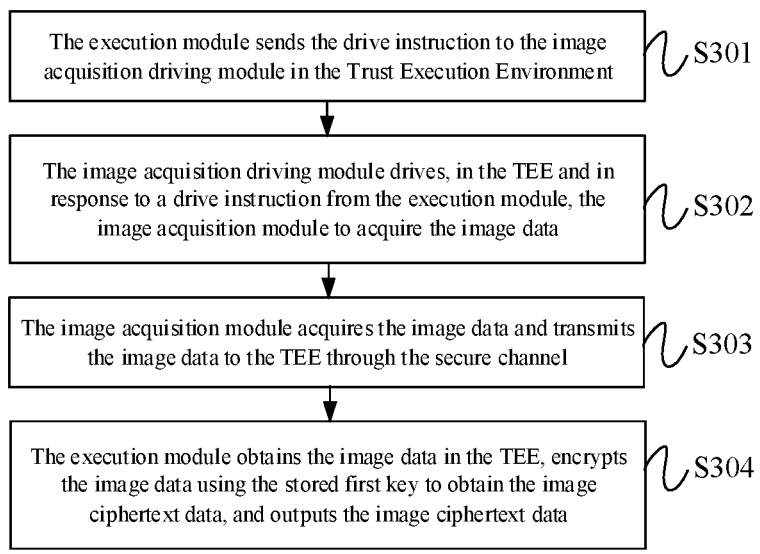
FIG. 4 is a flowchart of a data security processing method provided by an embodiment of the present application.

FIG. 4 is a flowchart of a data security processing method provided by an embodiment of the present application. The data security processing method can be applied to the data security processing terminal in the foregoing embodiments. As shown in FIG. 4, the data security processing method may include step S301 to step S304.

In step S301, the processor sends the drive instruction to the image acquisition driver in the Trust Execution Environment.

In step S302, the image acquisition driver drives, in the Trust Execution Environment and in response to a drive instruction from the processor, the image acquisition device to acquire the image data.

In step S303, the image acquisition device acquires the image data and transmits the image data to the Trust Execution Environment through the secure channel.

In step S304, the processor obtains the image data in the Trust Execution Environment, encrypts the image data using the stored first key to obtain the image ciphertext data, and outputs the image ciphertext data.

In the embodiment of the present application, the image acquisition device transmits the acquired image data to the Trust Execution Environment through the secure channel. The processor encrypts the image data. The encrypted image data (i.e. the image ciphertext data) is difficult to be tampered with, and the driving of the image acquisition device by the image acquisition driver and the encryption of the image data by the processor are both performed in the Trust Execution Environment. Therefore, the process of encrypting the image data and the process of the image acquisition driver driving the image acquisition device are also safe, thereby ensuring the security of the image data.

In some examples, the data security processing method may further include: outputting, by the processor, image verification auxiliary information obtained based on the image data.

The image verification auxiliary information is used to assist in security verification of decrypted image ciphertext data.

In a case where the data security processing terminal further includes a first application, the data security processing method further includes: obtaining, by the first application, the image ciphertext data and the image verification auxiliary information output by the processor, using the image verification auxiliary information as image verification information, and outputting the image ciphertext data and the image verification information to a server.

Correspondingly, in some examples, the above step of outputting, by the processor, image verification auxiliary information obtained based on the image data may be refined as:
calculating, by the processor, a digest of the image data according to a digest algorithm;
calculating, by the processor, a signature of the digest of the image data using a stored second key, and using the signature of the digest of the image data as the image verification auxiliary information.

In some other examples, the above step of outputting, by the processor, image verification auxiliary information obtained based on the image data may be refined as:
obtaining, by the processor, first integrated data, the first integrated data including a task identifier of a current task for acquiring the image data and a digest of the image data calculated according to a digest algorithm;
calculating, by the processor, an integrated signature of the first integrated data using a stored third key, and using the integrated signature of the first integrated data as the image verification auxiliary information.

In a case where the data security processing terminal further includes a second application, the data security processing method further includes: obtaining, by the second application, the image ciphertext data and the image verification auxiliary information output by the second application, processing the image verification auxiliary information to obtain image verification information, and outputting the image ciphertext data and the image verification information to a server.

The image verification information is used for security verification of decrypted image ciphertext data.

Correspondingly, in some examples, the image verification auxiliary information includes the image data, and the above step of processing, by the second application, the image verification auxiliary information to obtain the image verification information may include: calculating, by the second application, a digest of the image data according to a digest algorithm; calculating, by the second application, a signature of the digest of the image data using a stored fourth key, and using the signature of the digest of the image data as the image verification information.

In some examples, the image verification auxiliary information includes the image data, and the above step of processing, by the second application, the image verification auxiliary information to obtain image verification information may include: obtaining, by the second application, second integrated data, the second integrated data including a task identifier of a current task for acquiring the image data and a digest of the image data calculated according to a digest algorithm; calculating, by the second application, an integrated signature of the second integrated data using a stored fifth key, and using the integrated signature of the second integrated data as the image verification information.

The above data security processing method may further include the steps of acquisition of live-body feature data, live-body detection or the like, which is not limited herein.

The above data security processing method may further include: driving, by the image acquisition driver in response to the drive instruction, the image acquisition device to acquire live-body feature data; acquiring, by the image acquisition device, the live-body feature data corresponding to the image data.

In some examples, the data security processing method may further include: performing, by the processor, a live-body detection based on the live-body feature data to obtain live-body detection result data; obtaining, by the processor, a signature of the live-body detection result data using a stored sixth key, and outputting the live-body detection result data and the signature of the live-body detection result data.

In some other examples, the data security processing method may further include: obtaining, by the processor, third integrated data; obtaining, by the processor, an integrated signature of the third integrated data using a stored seventh key, and using the integrated signature of the third integrated data as image verification auxiliary information; outputting, by the processor, the live-body detection result data.

The third integrated data includes a task identifier of a current task for acquiring the image data, a digest of the image data calculated according to a digest algorithm, and live-body detection result data obtained by performing a live-body detection based on the live-body feature data.

In some further examples, the data security processing terminal includes a second application, and correspondingly, the data security processing method may further include: transmitting, by the processor, the live-body feature data to the second application; performing, by the second application, a live-body detection based on the live-body feature data to obtain live-body detection data; obtaining, by the second application, a signature of the live-body detection data using a stored eighth key, and outputting the live-body detection data and the signature of the live-body detection data.

In some further examples, the data security processing terminal includes a second application, and correspondingly, the data security processing method may further include: transmitting, by the processor, the live-body feature data to the second application; obtaining, by the second application, fourth integrated data; obtaining, by the second application, an integrated signature of the fourth integrated data using a stored ninth key, and using the integrated signature of the fourth integrated data as image verification auxiliary information; outputting, by the second application, the live-body detection result data to a server.

The fourth integrated data includes a task identifier of a current task for acquiring the image data, a digest of the image data calculated according to a digest algorithm, and live-body detection result data obtained by performing a live-body detection based on the live-body feature data.

Some steps in the data security processing terminal may be performed by the first application or the second application.

In some embodiments, related tasks may be performed by the first application or the second application.

Specifically, in some examples, the image verification auxiliary information includes the image data. The above data security processing method may further include: performing, by the first application or the second application, a recognition-related task according to the image data.

Specifically, in some other examples, the above data security processing method may further include: decrypting, by the first application or the second application, the image ciphertext data output by the processor using the stored first key, and performing the recognition-related task according to the decrypted image ciphertext data.

In some other embodiments, an image acquisition authority may be authenticated by the first application or the second application Specifically, in some examples, the above data security processing method may further include: receiving, by the first application or the second application, an image acquisition authority request, and verifying whether an initiator of the image acquisition authority request has an image acquisition authority; sending, by the first application or the second application, an invoking instruction to the processor under a condition that it is verified that the initiator of the image acquisition authority request has the image acquisition authority; sending, by the processor in response to the invoking instruction, a drive instruction to the image acquisition driver.

In some further embodiments, result processing business for the image recognition may be performed by the first application or the second application.

Specifically, in some examples, the above data security processing method may further include: acquiring, by the first application or the second application, user identity information, and outputting the user identity information to the server; receiving, by the first application or the second application, a recognition result sent by the server, and processing business corresponding to the image data acquisition according to the recognition result.

For related descriptions of the above data security processing method, reference may be made to the related content in the above embodiments, and details will not be repeated here.

Figure 5:
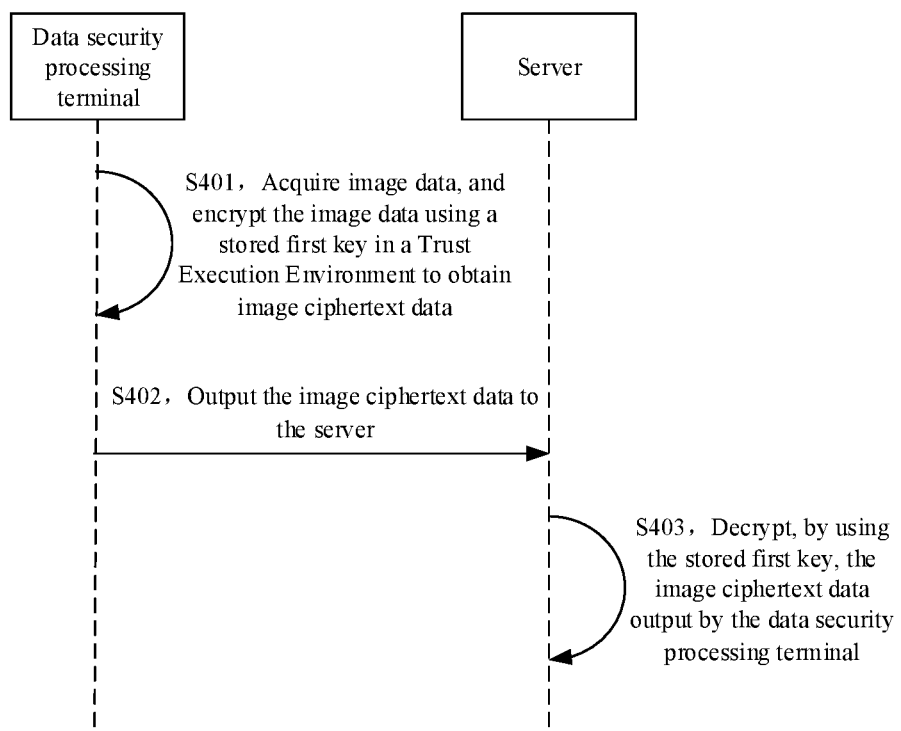
FIG. 5 is a flowchart of a data security processing method provided by an embodiment of the present application.

FIG. 5 is a flowchart of a data security processing method provided by an embodiment of the present application. The data security processing method can be applied to the data security processing system in the above embodiments. As shown in FIG. 5, the data security processing method may include step S401 to step S403.

In step S401, the data security processing terminal acquires image data, encrypts the image data using a stored first key in a Trust Execution Environment to obtain image ciphertext data.

In step S402, the data security processing terminal outputs the image ciphertext data to the server.

In step S403, the server decrypts, by using the stored first key, the image ciphertext data output by the data security processing terminal.

For technical effects of the data security processing method in the embodiment of the present application, reference may be made to the technical effects in the foregoing embodiments, and details will not be repeated here.

In some embodiments, the data security processing method may further include: performing, by the server, security verification on the decrypted image ciphertext data using image verification information output by the data security processing terminal.

The image verification information is obtained based on image verification auxiliary information.

In some embodiments, live-body detection data may also be introduced for live-body detection, so as to further improve security and reliability of image recognition, such as face recognition.

Specifically, in some examples, the above data security processing method may further include: outputting, by the data security processing terminal, live-body detection result data and a signature of the live-body detection result data obtained by using a first target key; matching, by the server, the signature of the live-body detection result data with the live-body detection result data based on the stored first target key; and determining, by the server, that live-body detection security verification is successful under a condition that the live-body detection result data matches the signature of the live-body detection result data.

In some other examples, the image verification information includes an integrated signature of target integrated data obtained by using a second target key, the target integrated data includes a digest of the image data, a task identifier and live-body detection result data. The data security processing method may further include: outputting, by the data security processing terminal, the live-body detection result data; calculating, by the server, a digest of the decrypted image ciphertext data; matching, by the server, the digest of the decrypted image ciphertext data and the image verification information and matching the live-body detection result data with the image verification information based on the stored second target key; and determining, by the server, that security verification is successful under a condition that the digest of the decrypted image ciphertext data matches the image verification information; and determining, by the server, that live-body detection security verification is successful under a condition the live-body detection result data matches the image verification information.

In some embodiments, the data security processing system may further perform user recognition, according to whether the security verification is successful. Specifically, the data security processing method may further include: outputting, by the data security processing terminal, user identity information to the server; performing, by the server under a condition that the security verification is successful, user recognition based on the user identity information and the decrypted image ciphertext data to obtain a recognition result, and sending the recognition result to the data security processing terminal.

In some embodiments, the data security processing system may further perform user recognition, according to whether the security verification and the live-body detection security verification are successful. Specifically, the data security processing method may further include: outputting, by the data security processing terminal, user identity information to the server; performing, by the server under a condition that the security verification is successful and the live-body detection security verification is successful, user recognition based on the user identity information and the decrypted image ciphertext data to obtain a recognition result, and sending the recognition result to the data security processing terminal.

For related description of the foregoing data security processing method, reference may be made to the relevant content of the data security processing system and the data security processing terminal in the foregoing embodiments, and details will not be repeated here.

It should be clear that the various embodiments in this specification are described in a progressive manner, and the same or similar parts between the various embodiments can be referred to each other. The description of each embodiment focuses on the difference from other embodiments. For the method embodiments, reference may be made to description parts of the embodiments of the data security processing terminal and the data security processing system for relevant details. The application is not limited to the specific steps and structures described above and shown in the figures. Those skilled in the art may make various changes, modifications and additions, or change the order among steps after grasping the spirit of the application. Also, for the sake of conciseness, a detailed description of known methods and technologies is omitted here.

Various aspects of the present application are described above with reference to the flowcharts and/or block diagrams of the methods, terminals and systems according to the embodiments of the present application. It should be understood that each block in the flowcharts and/or block diagrams and combinations of blocks in the flowcharts and/or block diagrams may be implemented by programs or instructions. These programs or instructions may be provided to a processor of a general-purpose computer, a special-purpose computer, or other programmable data processing device to produce a machine that causes the execution of these programs or instructions via the processor of the computer or other programmable data processing device to enable implementation of the functions/actions specified in one or more blocks of the flowcharts and/or block diagrams. Such a processor may be, but not limited to, a general-purpose processor, a dedicated processor, a special application processor, or a field programmable logic circuit. It can also be understood that each block in the block diagrams and/or flowcharts and the combination of the blocks in the block diagrams and/or flowcharts may also be implemented by dedicated hardware that performs a specified function or action, or may be implemented by a combination of dedicated hardware and computer instructions.

Those skilled in the art should understand that the above embodiments are all exemplary rather than restrictive. Different technical features appearing in different embodiments may be combined to achieve beneficial effects. Those skilled in the art should be able to understand and implement other modified embodiments of the disclosed embodiments on the basis of studying the drawings, the description, and the claims. In the claims, the term "comprising" does not exclude other means or steps; the quantifier "a/an" does not exclude multiple; the terms "first" and "second" are used to denote names rather than to indicate any specific order. Any reference signs in the claims should not be construed as limiting the scope of protection. The functions of multiple parts appearing in the claims may be implemented by a single hardware or software module. Appearance of certain technical features in different dependent claims does not mean that these technical features cannot be combined to achieve beneficial effects.

The invention claimed is:

1. A data security processing terminal, comprising:
    an image acquisition device configured to acquire image data and transmit the image data to a Trust Execution Environment through a secure channel;
    an image acquisition driver operating in the Trust Execution Environment and configured to drive, in response to a drive instruction, the image acquisition device to acquire the image data;
    a hardware processor operating in the Trust Execution Environment and configured to send the drive instruction to the image acquisition driver, obtain the image data, encrypt the image data using a stored first key to obtain image ciphertext data, and output the image ciphertext data,
    wherein the hardware processor is further configured to output image verification auxiliary information obtained based on the image data, and the image verification auxiliary information is used to assist in security verification of decrypted image ciphertext data.

2. The data security processing terminal according to claim 1, further comprising:
    a first application configured to obtain the image ciphertext data and the image verification auxiliary information, use the image verification auxiliary information as image verification information, and output the image ciphertext data and the image verification information to a server.

3. The data security processing terminal according to claim 2, wherein
    the image verification auxiliary information comprises the image data, and the first application is further configured to perform a recognition-related task according to the image data;
    or,
    the first application is further configured to decrypt the image ciphertext data output by the hardware processor using the stored first key, and perform the recognition-related task according to the decrypted image ciphertext data.

4. The data security processing terminal according to claim 2, wherein
    the first application is further configured to receive an image acquisition authority request, verify whether an initiator of the image acquisition authority request has an image acquisition authority, and send an invoking instruction to the hardware processor under a condition that it is verified that the initiator of the image acquisition authority request has the image acquisition authority;
    the hardware processor is further configured to send the drive instruction to the image acquisition driver in response to the invoking instruction.

5. The data security processing terminal according to claim 2, wherein
    the first application is further configured to acquire user identity information, output the user identity information to the server, receive a recognition result sent by the server, and process business corresponding to acquisition of the image data according to the recognition result.

6. The data security processing terminal according to claim 1, further comprising:
    a second application configured to obtain the image ciphertext data and the image verification auxiliary information, process the image verification auxiliary information to obtain image verification information, and output the image ciphertext data and the image verification information to a server, wherein the image verification information is used for security verification of decrypted image ciphertext data.

7. The data security processing terminal according to claim 6, wherein the image verification auxiliary information comprises the image data, and the second application is specifically configured to:
    calculate a digest of the image data according to a digest algorithm;
    calculate a signature of the digest of the image data using a stored fourth key, and use the signature of the digest of the image data as the image verification information.

8. The data security processing terminal according to claim 6, wherein the image verification auxiliary information comprises the image data, and the second application is specifically configured to:
    obtain second integrated data, the second integrated data comprising a task identifier of a current task for acquiring the image data and a digest of the image data calculated according to a digest algorithm;
    calculate an integrated signature of the second integrated data using a stored fifth key, and use the integrated signature of the second integrated data as the image verification information.

9. The data security processing terminal according to claim 1, wherein the hardware processor is further configured to:
    calculate a digest of the image data according to a digest algorithm;
    calculate a signature of the digest of the image data using a stored second key, and use the signature of the digest of the image data as the image verification auxiliary information.

10. The data security processing terminal according to claim 1, wherein the hardware processor is specifically configured to:
    obtain first integrated data, the first integrated data comprising a task identifier of a current task for acquiring the image data and a digest of the image data calculated according to a digest algorithm;
    calculate an integrated signature of the first integrated data using a stored third key, and use the integrated signature of the first integrated data as the image verification auxiliary information.

11. The data security processing terminal according to claim 1, wherein
    the image acquisition device is further configured to acquire live-body feature data corresponding to the image data;
    the image acquisition driver is further configured to drive, in response to the drive instruction, the image acquisition device to acquire the live-body feature data.

12. The data security processing terminal according to claim 11, wherein the hardware processor is further configured to:
perform a live-body detection based on the live-body feature data to obtain live-body detection result data;
obtain a signature of the live-body detection result data using a stored sixth key, and output the live-body detection result data and the signature of the live-body detection result data.

13. The data security processing terminal according to claim 11, wherein the hardware processor is further configured to:
obtain third integrated data, the third integrated data comprising a task identifier of a current task for acquiring the image data, a digest of the image data calculated according to a digest algorithm, and live-body detection result data obtained by performing a live-body detection based on the live-body feature data;
obtain an integrated signature of the third integrated data using a stored seventh key, and use the integrated signature of the third integrated data as image verification auxiliary information;
output the live-body detection result data.

14. The data security processing terminal according to claim 11, wherein the data security processing terminal further comprises a second application;
the hardware processor is further configured to transmit the live-body feature data to the second application;
the second application is configured to perform a live-body detection based on the live-body feature data to obtain live-body detection data, obtain a signature of the live-body detection data using a stored eighth key, and output the live-body detection data and the signature of the live-body detection data.

15. The data security processing terminal according to claim 11, wherein the data security processing terminal further comprises a second application;
the hardware processor is further configured to transmit the live-body feature data to the second application;
the second application is configured to: obtain fourth integrated data, the fourth integrated data comprising a task identifier of a current task for acquiring the image data, a digest of the image data calculated according to a digest algorithm, and live-body detection result data obtained by performing a live-body detection based on the live-body feature data; obtain an integrated signature of the fourth integrated data using a stored ninth key, and use the integrated signature of the fourth integrated data as image verification auxiliary information; and output the live-body detection result data to a server.

16. A data security processing system, comprising:
the data security processing terminal according to claim 1;
a server configured to decrypt the image ciphertext data output by the data security processing terminal using the stored first key.

17. The data security processing system according to claim 16, wherein the server is further configured to perform security verification on the decrypted image ciphertext data using image verification information output by the data security processing terminal, and the image verification information is obtained based on image verification auxiliary information.

18. The data security processing system according to claim 16, wherein
the data security processing terminal is further configured to output live-body detection result data and a signature of the live-body detection result data obtained by using a first target key;
the server is further configured to match the signature of the live-body detection result data with the live-body detection result data based on the stored first target key, and determine that live-body detection security verification is successful under a condition that the live-body detection result data matches the signature of the live-body detection result data.

19. The data security processing system according to claim 16, wherein image verification information comprises an integrated signature of target integrated data obtained by using a second target key, the target integrated data comprises a digest of the image data, a task identifier and live-body detection result data;
the data security processing terminal is further configured to output the live-body detection result data;
the server is specifically configured to calculate a digest of the decrypted image ciphertext data, match the digest of the decrypted image ciphertext data with the image verification information and match the live-body detection result data with the image verification information based on the stored second target key, and determine that security verification is successful under a condition that the digest of the decrypted image ciphertext data matches the image verification information, and determine that live-body detection security verification is successful under a condition that the live-body detection result data matches the image verification information.

* * * * *